(12) United States Patent
Hsu

(10) Patent No.: US 9,379,637 B2
(45) Date of Patent: Jun. 28, 2016

(54) ULTRA HIGH VOLTAGE REGULATOR

(71) Applicant: DiWIN technology CO. LTD, Taoyuan (TW)

(72) Inventor: Ching-Yueh Hsu, Taoyuan (TW)

(73) Assignee: DiWIN technology CO. LTD, Taoyuan (TW)

( * ) Notice: Subject to any disclaimer, the term of this patent is extended or adjusted under 35 U.S.C. 154(b) by 0 days.

(21) Appl. No.: 14/571,311

(22) Filed: Dec. 16, 2014

(65) Prior Publication Data
US 2015/0171765 A1    Jun. 18, 2015

(30) Foreign Application Priority Data

Dec. 16, 2013  (TW) .................................. 102146381

(51) Int. Cl.
*H02M 7/217*    (2006.01)
(52) U.S. Cl.
CPC ..................................... *H02M 7/217* (2013.01)
(58) Field of Classification Search
CPC ..................................................... H02M 7/217
See application file for complete search history.

(56) References Cited

U.S. PATENT DOCUMENTS

| | | | | | |
|---|---|---|---|---|---|
| 5,459,652 A * | 10/1995 | Faulk | ...................... | H02M 1/36 323/901 |
| 5,640,317 A * | 6/1997 | Lei | .......................... | H02M 1/36 363/49 |
| 6,804,126 B2 * | 10/2004 | Lucas | ..................... | H02M 1/36 363/20 |
| 6,912,140 B2 * | 6/2005 | Kasai | ...................... | H02M 1/36 323/901 |
| 7,432,690 B2 * | 10/2008 | Williams | ........... | H05B 37/0218 323/222 |
| 2010/0259952 A1 * | 10/2010 | Zhu | ........................ | H02M 1/36 363/20 |

\* cited by examiner

*Primary Examiner* — Jue Zhang
(74) *Attorney, Agent, or Firm* — ScienBiziP, P.C.

(57) ABSTRACT

An ultra high voltage regulator for converting includes a rectifying circuit, a first transistor, a second transistor, an output capacitor, a first resistor, a second resistor, and a third resistor. The ultra high voltage regulator converts a received alternative current into a direct voltage to an electrical component. The ultra high voltage regulator capable of providing a larger current becomes more compact and thinner in size without cooperating with a mass transformer/high voltage capacitor, which satisfies the request for miniaturization of the electrical components.

20 Claims, 10 Drawing Sheets

Channel 1 unit: 10V,2ms
Channel 2 unit: 100V,2ms
Channel 3 unit: 1A,2ms
Channel 4 unit: 10V,2ms Channel 1 unit: 10V,2ms
Channel 2 unit: 100V,2ms
Channel 3 unit: 1A,2ms
Channel 4 unit: 10V,2ms Channel 1 unit: 10V,2ms
Channel 2 unit: 100V,2ms
Channel 3 unit: 1A,2ms
Channel 4 unit: 10V,2ms Channel 1 unit: 5V,4ms
Channel 2 unit: 5V,4ms
Channel 3 unit: 2A,4ms
Channel 4 unit: 100V,4msg

ULTRA HIGH VOLTAGE REGULATOR

CROSS-REFERENCE TO RELATED APPLICATIONS

This application claims priority to Taiwanese Patent Application No. 102146381 filed on Dec. 16, 2013, the contents of which are incorporated by reference herein.

FIELD

The subject matter herein relates to an ultra high voltage regulator.

BACKGROUND

A linear type AC/DC power supply and a switching type AC/DC power supply are widely used. The linear type AC/DC power supply receiving a high voltage and a large current (more than 10 mA) needs mass heat dissipation, and the converting efficiency of the linear type AC/DC power supply is decreased. With an improved converting efficiency, the circuit structures of the switching type AC/DC power supply can be a non-isolated buck-boost circuit, an isolated flyback circuit, a non-isolated buck circuit, an isolated forward circuit, or a push-pull circuit. However, the isolated circuit cooperates with a mass transformer, and the ground in the non-isolated circuit is a fire wire of the alternating current, a neutral line, or a floating ground.

BRIEF DESCRIPTION OF THE FIGURES

Implementations of the present technology will now be described, by way of example only, with reference to the attached figures.

DETAILED DESCRIPTION

Figure 1:
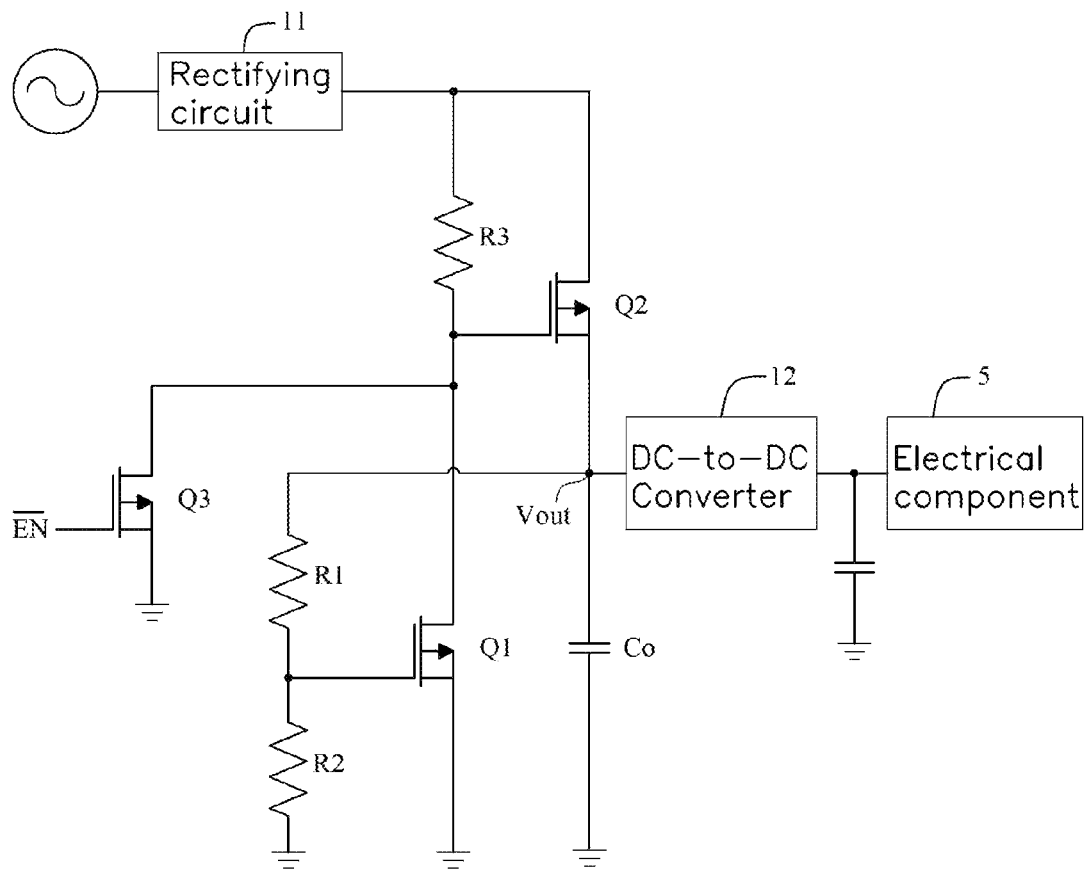
FIG. 1 is a diagrammatic view of an embodiment of an ultra high voltage regulator.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series and the like. The switch element can be for example a Bipolar Junction Transistor (BJT) or a Metal-Oxide-Semiconductor Field Effect Transistor (MOSFET). In order to conveniently describe, the MOSFET is employed in each embodiment.

The present disclosure is described in relation to an ultra high voltage regulator.

FIG. 1 illustrates an embodiment of an ultra high voltage regulator 100. The ultra high voltage regulator 100 includes an input terminal for receiving an alternating (AC) voltage (such as 110 V) and an output terminal for outputting a direct voltage Vout. The ultra high voltage regulator 100 further includes a DC-to-DC converter (or a linear voltage regulator) 12 for outputting a lower voltage (e.g. 5 volts or 3.3 volts) to a power terminal of an electronic component 5.

The ultra high voltage regulator 100 further includes a rectifying circuit 11, a first transistor Q1, a second transistor Q2, a third transistor Q3, an output capacitor Co, a first resistor R1, a second resistor R2, and a third resistor R3.

The rectifying circuit 11 is a full bridge rectifying circuit. The rectifying circuit 11 generates a rectifying signal based on the received AC voltage. A waveform of the rectifying signal is shown in channel 2 of FIG. 5. The first transistor Q1 includes a first reference terminal (drain electrode), a first driving terminal (source electrode), and a first controlling terminal (gate electrode). The second transistor Q2 includes a second reference terminal (drain electrode), a second driving terminal (source electrode), and a second controlling terminal (gate electrode). The second reference terminal is electrically connected to the rectifying circuit 11 for receiving the rectifying signal. The second controlling terminal is electrically connected to the first reference terminal. The second driving terminal is electrically connected to the output terminal. Opposite terminals of the first transistor R1 are respectively electrically connected to the first controlling terminal and the output capacitor Co. Opposite terminals of the second transistor R2 are respectively electrically connected to the first controlling terminal and the ground. Opposite terminals of the third transistor R3 are respectively electrically connected to the second controlling terminal and the second reference terminal. The first driving terminal is grounded.

The ultra high voltage regulator 100 further includes a starting switch Q3. The starting switch Q3 includes a third controlling terminal, a third driving terminal, and a third reference terminal. The third driving terminal is grounded. The third reference terminal is electrically connected between the third resistor R3 and the first reference terminal. When the third controlling terminal receives an enable signal ($\overline{EN}$) at a high level, the starting switch Q3 turns on, which causes the second controlling terminal to be grounded. The second transistor Q2 turns off. On the contrary, when the starting switch Q3 turns off, the second transistor Q2 turns on.

An operation method of the ultra high voltage regulator 100 is described as follows.

At a first phase, the starting switch Q3 and the first transistor Q1 turn off, and a current passing through the third resistor R3, which causes the second transistor Q2 turn on. The output capacitor Co charges, increasing the output voltage Vout of the output terminal.

At a second phase, a voltage difference Vgs1 between the first controlling terminal and the first driving terminal is calculated by the equation Vout*R2/(R1+R2). When the Vgs1 is greater than a threshold voltage Vth, the first transistor Q1 turns on and the current passing through the third resistor R3 and the first transistor Q1, which causes a voltage difference Vgs2 between the second controlling terminal and the second driving terminal to be decreased. The second transistor Q2 turns off. The voltage Vout of the output terminal is equal to Vth*(R1+R2)/R2.

At a third phase, the electrical component 5 discharges, which causes the voltage difference Vgs1 of the first transistor Q1 to be decreased. The first transistor Q1 turns off. The voltage difference Vgs2 of the second transistor Q2 increases (an internal capacitor Cgs is charged via the third resistor R3) and returns to the first phase for charging the output capacitor Co to increase the output voltage Vout of the output terminal.

Because a voltage at the output terminal Vout is ranged from, for example, about 6V to 10V, the ultra high voltage regulator 100 further includes a DC-to-DC converter (or a linear voltage regulator) 12 connected between the output capacitor Co and the electrical component 5 for satisfying with the voltage requirement of the electrical component 5.

The ultra high voltage regulator 100 of the embodiment becomes smaller and thinner in size without cooperating with a mass transformer/high voltage capacitor as an assembly.

Figure 2:
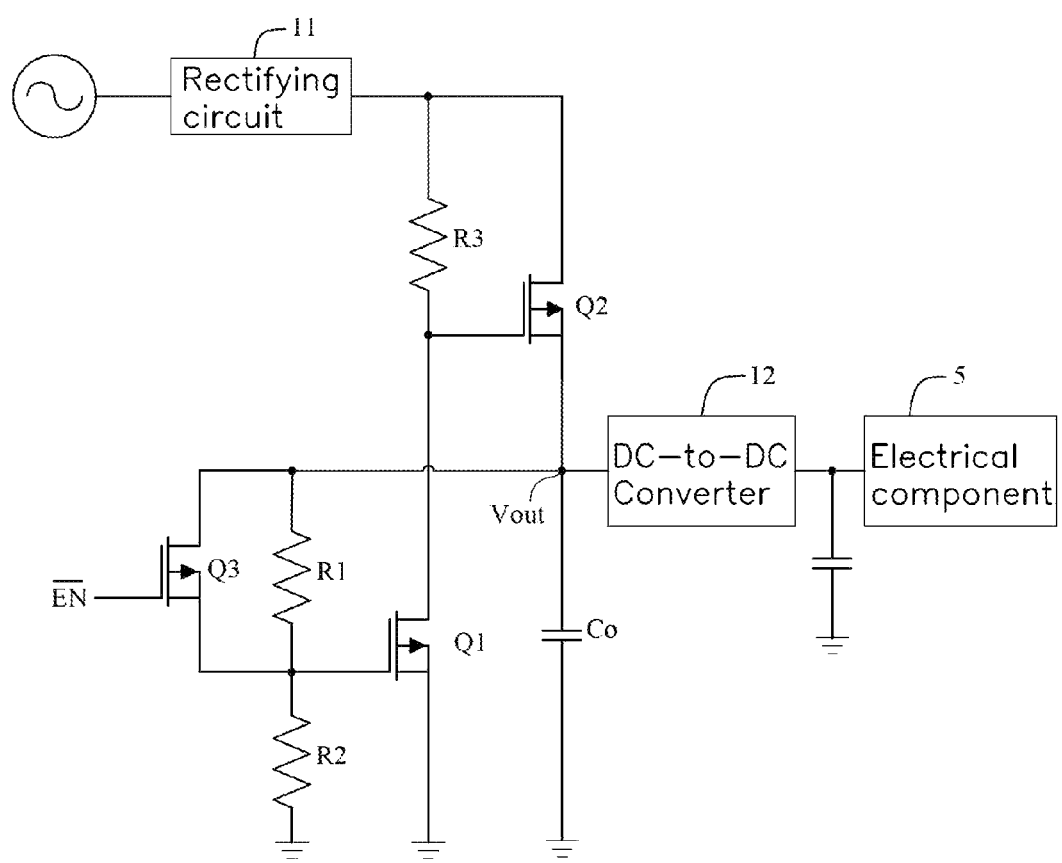
FIG. 2 is a diagrammatic view of a second embodiment of the ultra high voltage regulator.

FIG. 2 illustrates a second embodiment of the ultra high voltage regulator 200 with a similar circuit structure of the first embodiment, the difference includes: the starting switch Q3 is a transistor, which is different from the starting switch Q3 in the first embodiment. The starting switch Q3 includes a third controlling terminal, a third driving terminal, and a third reference terminal. The third driving terminal is electrically connected to the first controlling terminal of the first transistor Q1. The third reference terminal is electrically connected to the output terminal and the first resistor R1. When the third driving terminal receives the high level enable signal (EN), the starting switch Q3 turns on, which causes the first transistor Q1 to be turned on. The second transistor Q2 turns off.

Figure 3:
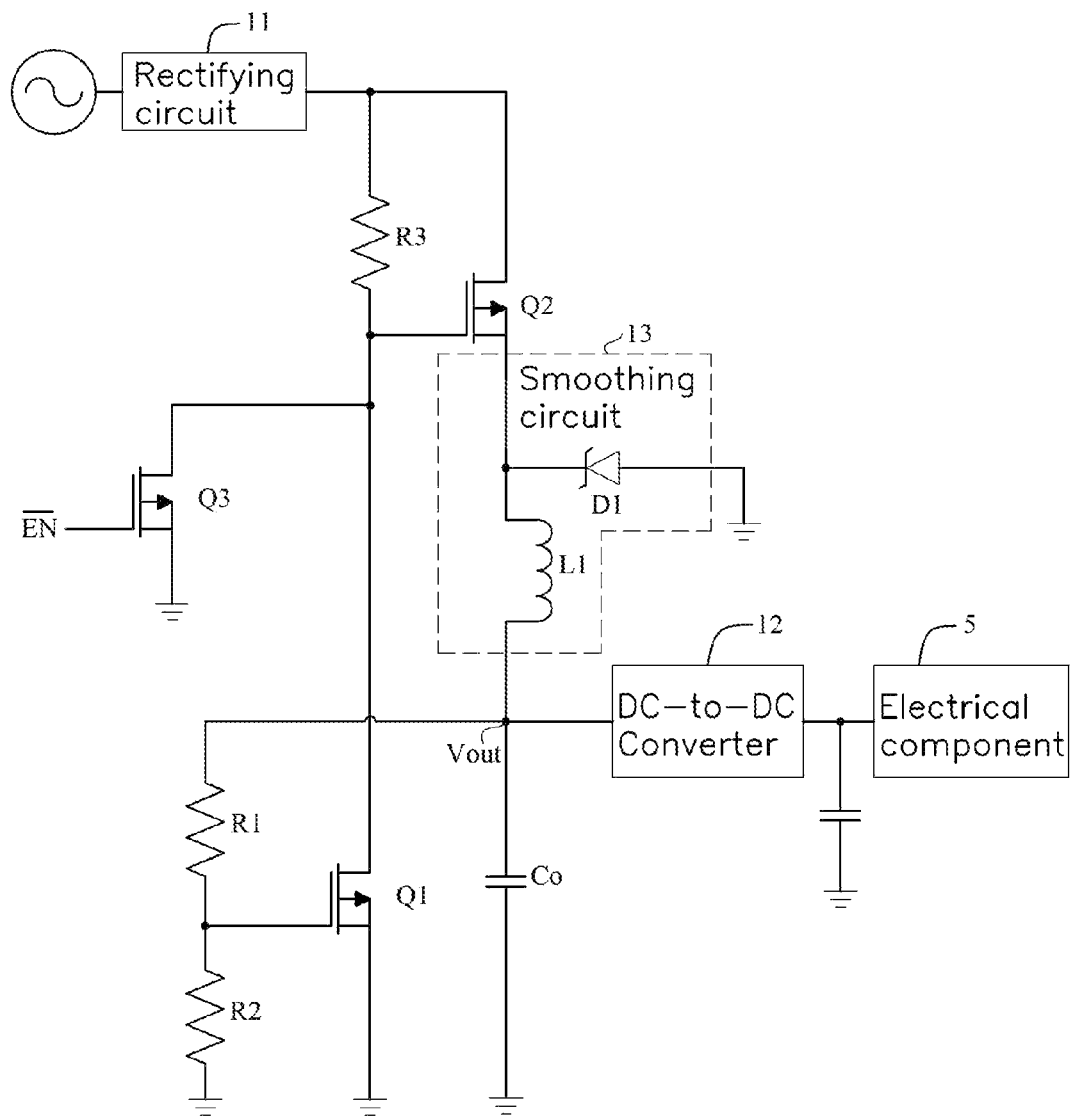
FIG. 3 is a diagrammatic view of a third embodiment of the ultra high voltage regulator.

FIG. 3 illustrates a third embodiment of the ultra high voltage regulator 300 similar to the first embodiment. The ultra high voltage regulator 300 also includes a rectifying circuit 11, a first transistor Q1, a second transistor Q2, a first resistor R1, a second resistor R2, a third resistor R3, and an output capacitor Co. The ultra high voltage regulator 300 further includes a smoothing circuit 13, which is different from the ultra high voltage regulator 100. The smoothing circuit 13 is connected to a second driving terminal of the second transistor Q2, an output terminal of the ultra high voltage regulator 300, and the ground.

The rectifying circuit 11 generates a rectifying signal based on the received the AC current. A waveform of the rectifying signal is shown in channel 2 of FIG. 5. In this one embodiment, the rectifying circuit 11 is a full bridge rectifying circuit 11. The first transistor Q1 includes a first reference terminal, a first driving terminal, and a first controlling terminal. The second transistor Q2 includes a second reference terminal, a second driving terminal, and a second controlling terminal. The second reference terminal is electrically connected to the output terminal of the rectifying circuit 11 for receiving the rectifying signal. A terminal of the first resistor R1 is electrically connected between the output terminal and the smoothing circuit 13, and an opposite terminal of the first resistor R1 is electrically connected to the first controlling terminal Opposite terminals of the second transistor R2 are respectively electrically connected to the first controlling terminal and the ground. Opposite terminals of the third transistor R3 are respectively electrically connected to the second controlling terminal and the first reference terminal.

The smoothing circuit 13 is coupled to the second driving terminal (the drain source electrode) of the second transistor Q2, the output terminal of the ultra high voltage regulator 300, and the ground and is configured to smooth a waveform of the voltage. In at least one embodiment, the smoothing circuit 13 includes an inductor L1 and a flyback diode D1. One terminal of the output capacitor Co is electrically connected to the output terminal, and an opposite terminal of the output capacitor Co is grounded. One terminal of the inductor L1 is electrically connected to the output terminal, and opposite terminal of the inductor L1 is electrically connected to the second driving terminal. A cathode of the flyback diode D1 is electrically connected to the second driving terminal (source electrode), and an anode of the flyback diode D1 is grounded.

Figure 4:
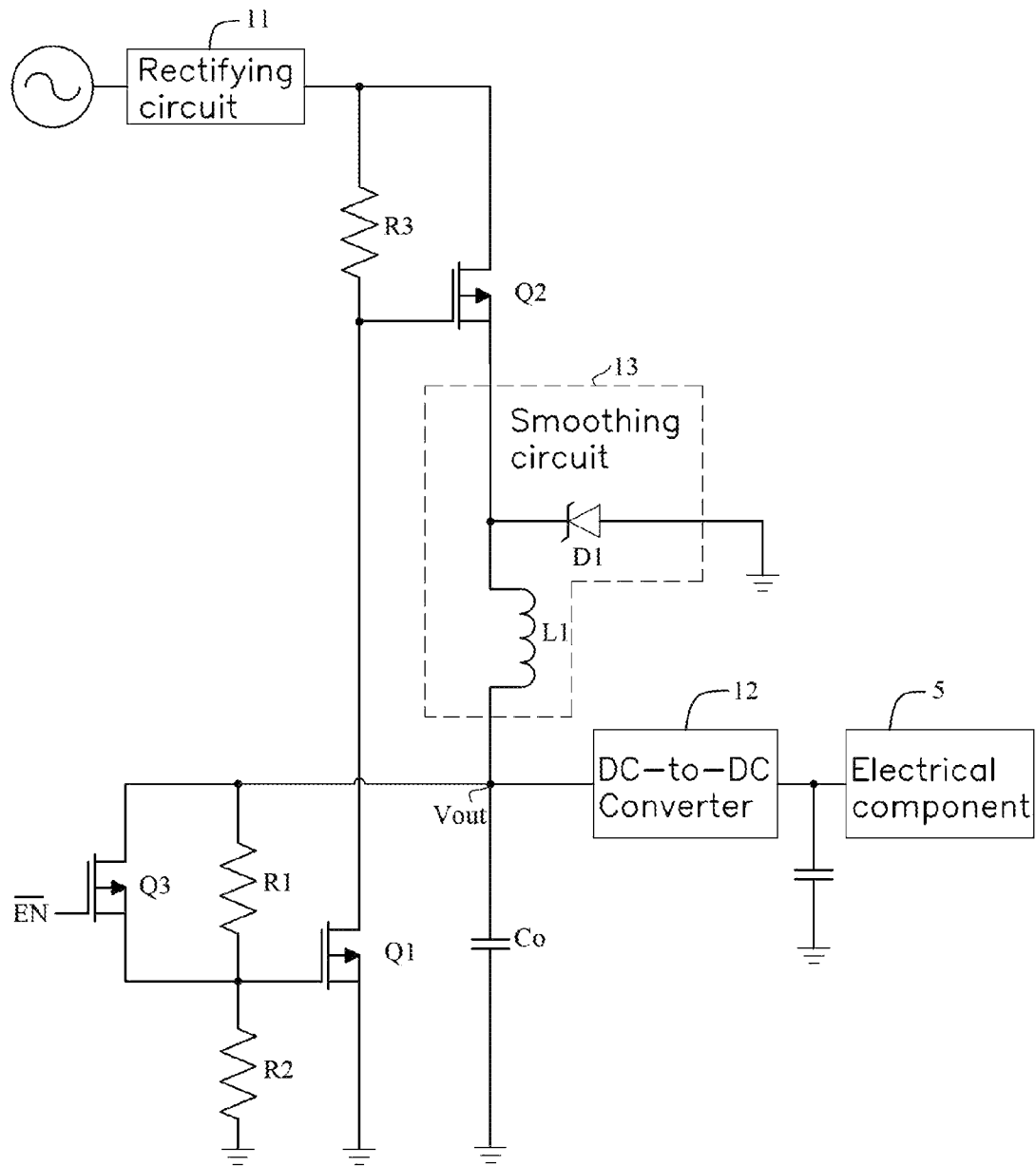
FIG. 4 is a diagrammatic view of a fourth embodiment of the ultra high voltage regulator.

FIG. 4 illustrates a fourth embodiment of the ultra high voltage regulator 400 similar to the third embodiment. A starting switch Q3 of the ultra high voltage regulator 400 is a transistor, which is different from the ultra high voltage regulator 300. A third driving terminal of the starting switch Q3 is electrically connected to a first controlling terminal of a first transistor Q1. A third reference terminal of the starting switch Q3 is electrically connected to an output terminal of the ultra high voltage regulator 400. When the third driving terminal of the starting switch Q3 receives the high level enable signal (EN), the starting switch Q3 turns on, which causes the first transistor Q1 to be turned on, and a second transistor Q2 to be turned off.

Figure 5:
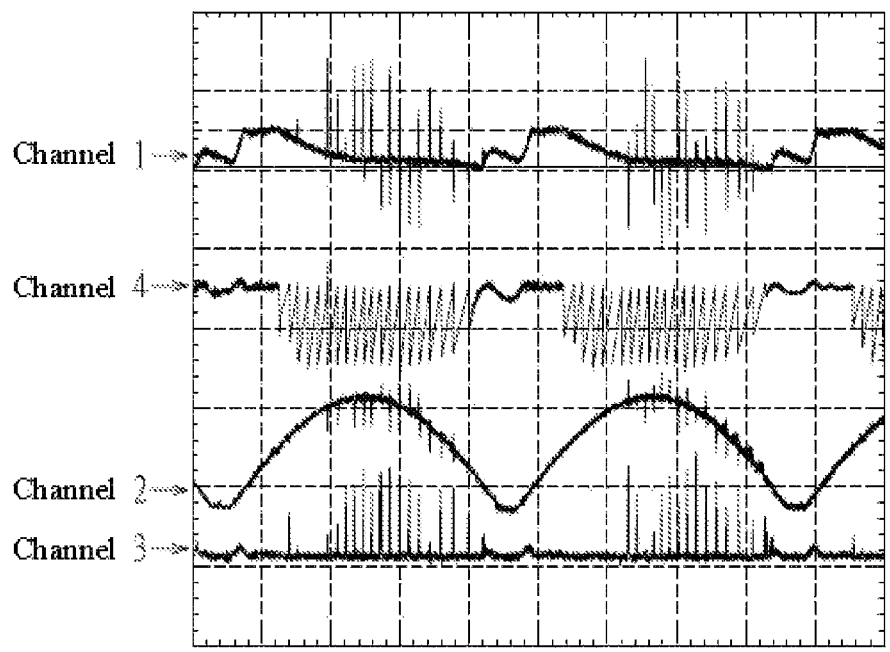
FIG. 5 is waveforms of an embodiment of four parameters of the ultra high voltage regulator of FIG. 1 under a condition of a 100 V AC voltage and a 17 mA.

FIG. 5 illustrates waveforms of the output voltage (channel 1), the enable signal (channel 2), the input current (channel 3), and the voltage difference Vgs2 (channel 4) of the ultra high voltage regulator 100 under a 100V AC voltage and a 17 mA. A ripple can be eliminated by a linear voltage regulator added on the output terminal. The output voltage is 8.5V and the output current is 17 mA.

Figure 6:
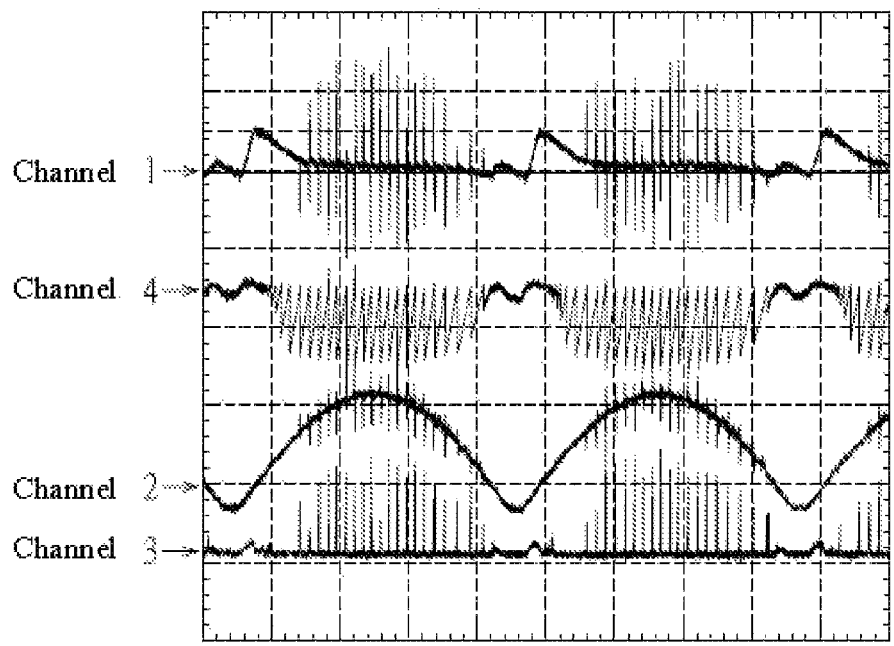
FIG. 6 is waveforms of an embodiment of four parameters of the ultra high voltage regulator of FIG. 2 under a condition of a 100 V AC voltage and a 22 mA.

FIG. 6 illustrates waveforms of the output voltage (channel 1), the enable signal (channel 2), the input current (channel 3), and the voltage difference Vgs2 (channel 4) of the ultra high voltage regulator 100 under a 100V AC voltage and a 22 mA output current. The output voltage is 7.2V and the output current is 22 mA.

Figure 7:
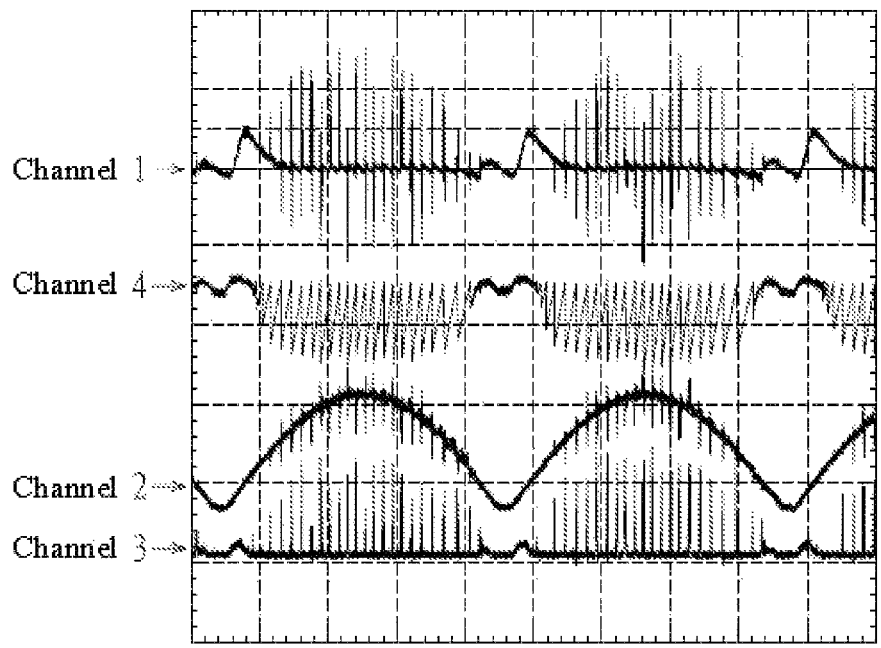
FIG. 7 is waveforms of an embodiment of four parameters of the ultra high voltage regulator of FIG. 3 under a condition of a 100 V AC voltage and a 31 mA.

FIG. 7 illustrates waveforms of the output voltage (channel 1), the enable signal (channel 2), the input current (channel 3), and the voltage difference Vgs2 (channel 4) of the ultra high voltage regulator 100 under a 100V AC voltage and a 31 mA output current. The output voltage is 6.7V and the output current is 31 mA.

The circuit structures of the ultra high voltage regulators 100, 200, 300 and 400 in the four embodiments are suitable for use in a lower power controlling structure. The circuit structure of the ultra high voltage regulators in the fifth, sixth, and seventh embodiments as shown below are suitable for use in a larger power controlling structure.

Figure 8:
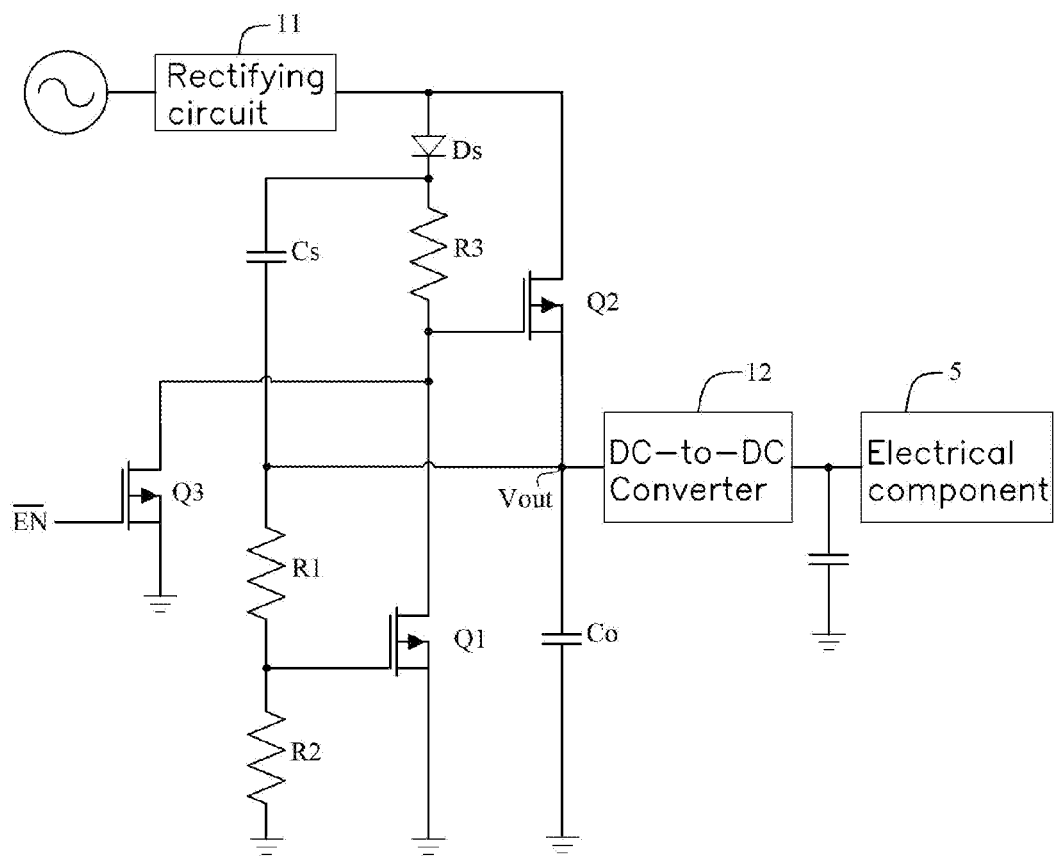
FIG. 8 is a diagrammatic view of a fifth embodiment of the ultra high voltage regulator.

FIG. 8 illustrates a fifth embodiment of the ultra high voltage regulator 500 with a similar structure of the ultra high voltage regulator 100. The ultra high voltage regulator 500 further includes a bootstrap diode Ds and a bootstrap capacitor Cs. An anode of the bootstrap diode Ds is electrically connected to an output terminal of the rectifying circuit 11, and a cathode of the bootstrap diode Ds is electrically connected to the third resistor R3. One terminal of the bootstrap capacitor Cs is electrically connected to the cathode of the bootstrap diode Ds, and an opposite terminal of the bootstrap capacitor Cs is electrically connected to the output terminal and the first resistor R1. The switching speed of the second transistor Q2 and the converting efficiency of the ultra high voltage regulator 500 are improved.

Figure 9:
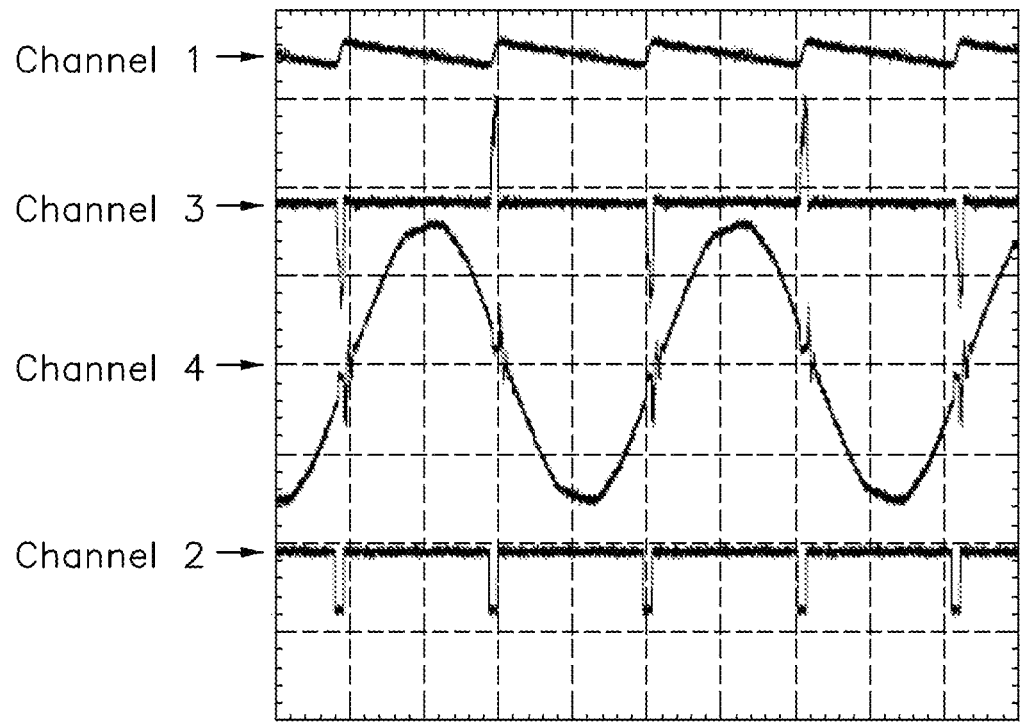
FIG. 9 is waveforms of an embodiment of four parameters of the ultra high voltage regulator of FIG. 8 under a condition of a 100 VAC voltage and a 100 mA.

FIG. 9 illustrates waveforms of the output voltage (channel 1), the enable signal (channel 2), the input current (channel 3), and the input voltage (channel 4) of the ultra high voltage regulator 500 under a 100V AC voltage and a 100 mA output current. The output voltage is 10V and the output current is 100 mA. Moreover, when a frequency signal (e.g. $\overline{EN}$) is applied to the third control signal, a transfer efficiency of the ultra high voltage regulator 500 is improved under the control of the frequency signal.

Figure 10:
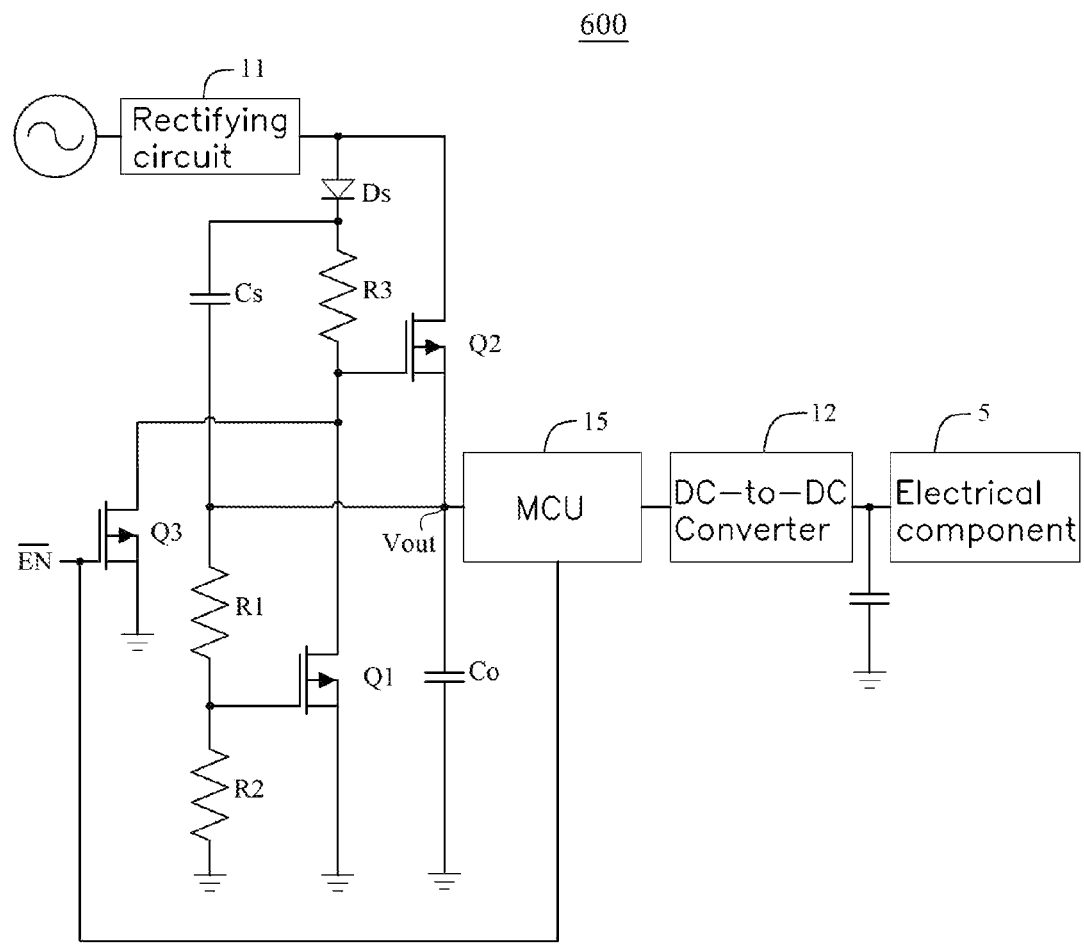
FIG. 10 is a diagrammatic view of a sixth embodiment of the ultra high voltage regulator.

FIG. 10 illustrates a sixth embodiment of the ultra high voltage regulator 600 with a similar circuit structure of the ultra high voltage regulator 100. The ultra high voltage regulator 600 further includes a micro control unit (MCU) 15. One terminal of the MCU 15 is electrically connected to the output terminal, and another terminal of the MCU 15 is electrically connected to the enable signal ($\overline{EN}$). The MCU 15 detects a voltage Vout of the output terminal or a voltage slope of the output terminal as a feedback data to be calculated for adjusting a frequency of the enable signal ($\overline{EN}$), which causes the first transistor Q1 and the second transistor Q2 to be turned on or turned off. For example, when being powered on with a 50 hertz (Hz) constant frequency and a 10 milli seconds (ms) time interval, the enable signal ($\overline{EN}$), the MCU 15 adjusts the frequency of the enable signal ($\overline{EN}$) based on calculating and analyzing the detected voltage Vout of the output terminal. Until the voltage slope of the output terminal changes the frequency of the enable signal ($\overline{EN}$) to be zero or a negative value, as a standard frequency, and the MCU 15 keeps outputting the enable signal ($\overline{EN}$) with the standard frequency, which triggers the first transistor Q1 and controls the second transistor Q2 to be turned on or turned off for charging or discharging the output capacitor Co. The switching speed of the second transistor Q2 and the converting efficiency of the ultra high voltage regulator 600 are improved.

FIG. 10 also illustrates a seventh embodiment of the ultra high voltage regulator 600 with a similar structure of the ultra high voltage regulator 100. The ultra high voltage regulator 600 further includes a micro control unit (MCU) 15. One terminal of the MCU 15 is electrically connected to the output terminal, and another terminal of the MCU 15 is electrically connected to a terminal for inputting the enable signal ($\overline{EN}$). The MCU 15 detects a current of the output terminal as a feedback data calculated for adjusting a frequency of the enable signal ($\overline{EN}$), which causes the first transistor Q1 and the second transistor Q2 to be turned on or turned off. For example, when being powered on with a 50 Hz constant frequency and a 10 ms time interval, the enable signal ($\overline{EN}$), the MCU 15 adjusts the frequency of the enable signal ($\overline{EN}$) based on calculation and analyzing of the detected current of the output terminal. When a current outputted by the second transistor Q2 to the output capacitor Co reaches zero value, the frequency of the enable signal ($\overline{EN}$) is recognized as a standard frequency, and the MCU 15 keeps the enable signal ($\overline{EN}$) with the standard frequency which causes the first transistor Q1 to control the second transistor Q2 to be turned on or turned off for charging or discharging the output capacitor Co. The current outputted by the second transistor Q2 can be increase from a negative value to zero, or decrease from a positive to zero. The switching speed of the second transistor Q2 and the converting efficiency of the ultra high voltage regulator 600 are improved. When a current outputted by the second transistor Q2 to the output capacitor Co reaches zero value, the frequency of the enable signal ($\overline{EN}$) is recognized as a standard frequency, and the MCU 13 keeps the enable signal ($\overline{EN}$) with the standard frequency which causes the first transistor Q1 to control the second transistor Q2 to be turned on or turned off for charging or discharging the capacitor. The current outputted by the second transistor Q2 can be increase from a negative value to zero, or decrease from a positive to zero. The switching speed of the second transistor Q2 and the converting efficiency of the ultra high voltage regulator 600 are improved.

The ultra high voltage regulators 100, 200, 300, 400, and 500 respectively include the rectifying circuit 11, the first transistor Q1, the second transistor Q2, the output capacitor Co, a first resistor R1, a second resistor R2, and a third resistor R3. The ultra high voltage regulators 100, 200, 300, 400, and 500 convert the received AC into larger magnitudes DC provided to the electrical component 5, and the size of the ultra high voltage regulators 100, 200, 300, 400, and 500 become more compact and thinner in size in relation to a voltage regulator with an larger insulated type circuit structure. The ultra high voltage regulators 100, 200, 300, 400, and 500 without a high voltage capacitor are used in a smart socket, a smoke detector, a smart switch, or a wireless sensor of a home automation network (HAN) system.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims.

What is claimed is:

1. An ultra high voltage regulator comprising:
an input terminal configured to receive an alternating current;
an output terminal configured to provide a direct voltage to an electrical component;
a rectifying circuit configured to generate a rectifying signal based on the received alternating current;
a first transistor including a first reference terminal, a first driving terminal, and a first controlling terminal;
a second transistor including a second reference terminal connected to the rectifying circuit for receiving the rectifying signal, a second controlling terminal connected to the first reference terminal, and a second driving terminal connected to the output terminal;
an output capacitor with a terminal connected between the second driving terminal and the electrical component and an opposite terminal connected to the ground;
a first resistor with two opposite terminals respectively connected to the second driving terminal and the first controlling terminal;
a second resistor with two opposite terminals respectively connected to the first controlling terminal and the ground; and
a third resistor two opposite terminals respectively connected to the second controlling terminal and the second reference terminal;
wherein a divided voltage at a node between the first and second resistors is directly output to the first controlling terminal of the first transistor.

2. The ultra high voltage regulator of claim 1, further comprising a starting switch; wherein the starting switch comprises a third controlling terminal, a third driving terminal, and a third reference terminal; the third driving terminal is grounded, the third reference terminal is electrically connected to the second controlling terminal; the third controlling terminal receives an enable signal to turn on the starting switch, and the third reference terminal controls the second transistor to be turned off when the starting switch turns on.

3. The ultra high voltage regulator of claim 1, further comprising a starting switch; wherein the starting switch comprises a third controlling terminal, a third driving terminal, and a third reference terminal; the third reference terminal is electrical connected to the output terminal; the third controlling terminal receives an enable signal to turn on or turn off the starting switch; the third driving terminal is electrically connected to the first controlling terminal; the third driving terminal controls the first transistor to be turned on for turning off the second transistor.

4. The ultra high voltage regulator of claim 1, further comprising a bootstrap diode and a bootstrap capacitor; wherein an anode of the bootstrap diode is electrically connected to the output terminal of the rectifying circuit, and a cathode of the bootstrap diode is electrically connected to the third resistor; one terminal of the bootstrap capacitor is electrically connected to the cathode of the bootstrap diode, and an opposite terminal of the bootstrap capacitor is electrically connected to the output terminal and the first resistor.

5. The ultra high voltage regulator of claim 1, further comprising a micro control unit (MCU), wherein one terminal of the MCU is electrically connected to the output terminal, and another terminal of the MCU is electrically connected to a terminal for inputting an enable signal.

6. The ultra high voltage regulator of claim 5, wherein the MCU adjusts a frequency of the enable signal based on a voltage slope of the output terminal until the voltage slope is zero or a negative value.

7. The ultra high voltage regulator of claim 5, wherein the MCU adjusts a frequency of the enable signal based on calculating and analyzing a current difference of the output terminal until the current difference of the output terminal is zero.

8. The ultra high voltage regulator of claim 1, further comprising a direct to direct converter or a linear voltage regulator, wherein the direct to direct converter or the linear voltage regulator is electrically connected between the output terminal and the electrical component.

9. The ultra high voltage regulator of claim 2, further comprising a direct to direct converter or a linear voltage regulator, wherein the direct to direct converter or the linear voltage regulator is electrically connected between the output terminal and the electrical component.

10. The ultra high voltage regulator of claim 3, further comprising a direct to direct converter or a linear voltage regulator, wherein the direct to direct converter or the linear voltage regulator is electrically connected between the output terminal and the electrical component.

11. The ultra high voltage regulator of claim 4, further comprising a direct to direct converter or a linear voltage regulator, wherein the direct to direct converter or the linear voltage regulator is electrically connected between the output terminal and the electrical component.

12. The ultra high voltage regulator of claim 5, further comprising a direct to direct converter or a linear voltage regulator, wherein the direct to direct converter or the linear voltage regulator is electrically connected between the output terminal and the electrical component.

13. The ultra high voltage regulator of claim 6, further comprising a direct to direct converter or a linear voltage regulator, wherein the direct to direct converter or the linear voltage regulator is electrically connected between the output terminal and the electrical component.

14. The ultra high voltage regulator of claim 7, further comprising a direct to direct converter or a linear voltage regulator, wherein the direct to direct converter or the linear voltage regulator is electrically connected between the output terminal and the electrical component.

15. An ultra high voltage regulator comprising:
    an input terminal configured to receive an alternating current;
    an output terminal configured to provide a direct voltage to an electrical component;
    a rectifying circuit configured to generate a rectifying signal based on the received alternating current;
    a first transistor including a first reference terminal, a first driving terminal, and a first controlling terminal;
    a second transistor including a second reference terminal connected to the rectifying circuit, a second controlling terminal connected to the first reference terminal, and a second driving terminal;
    a smoothing circuit connected to the second driving terminal, the output terminal, and the ground;
    an output capacitor with a terminal connected between the output terminal and the electrical component, and an opposite terminal connected to the ground;
    a first resistor with two opposite terminals respectively connected to the output terminal and the first controlling terminal;
    a second resistor with two opposite terminals respectively connected to the first controlling terminal and the ground; and
    a third resistor with two opposite terminals respectively connected to the second controlling terminal and the second reference terminal;
    wherein a divided voltage at a node between the first and second resistors is directly provided to the first controlling terminal of the first transistor.

16. The ultra high voltage regulator of claim 15, wherein the smoothing circuit comprises an inductor and a flyback diode; one terminal of the output capacitor is electrically connected to the output terminal, and an opposite terminal of the output capacitor is grounded; one terminal of the inductor is electrically connected to the output terminal, and opposite terminal of the inductor is electrically connected to the second driving terminal; a cathode of the flyback diode is electrically connected to the second driving terminal, and an anode of the flyback diode is grounded.

17. The ultra high voltage regulator of claim 16, further comprising a starting switch; wherein the starting switch comprises a third controlling terminal, a third driving terminal, and a third reference terminal; the third driving terminal is grounded, the third reference terminal is connected to the second controlling terminal; the third controlling terminal receives an enable signal to turn on the starting switch, and the third reference terminal controls the second transistor to be turned off the second transistor when the starting switch turns on.

18. The ultra high voltage regulator of claim 17, further comprising a starting switch; wherein the starting switch comprises a third controlling terminal, a third driving terminal, and a third reference terminal; the third controlling terminal receives an enable signal to turn on or turn off the starting switch; the third driving terminal is electrically connected to the first controlling terminal; the third reference terminal is connected to the output terminal; and the third driving terminal controls the first transistor to be turned on for turning off the second transistor.

19. The ultra high voltage regulator of claim 17, further comprising a direct to direct converter or a linear voltage regulator, wherein the direct to direct converter or the linear voltage regulator is electrically connected between the output terminal and the electrical component.

20. The ultra high voltage regulator of claim 18, further comprising a direct to direct converter or a linear voltage regulator, wherein the direct to direct converter or the linear voltage regulator is electrically connected between the output terminal and the electrical component.

* * * * *